United States Patent
Furuki et al.

[19]

[11] Patent Number: 6,141,065
[45] Date of Patent: Oct. 31, 2000

[54] OPTICAL COLOR PRINTER ASSEMBLY

[75] Inventors: Ichiro Furuki; Keiki Yamada, both of Tokyo, Japan

[73] Assignee: Mitsubishi Denki Kabushiki Kaisha, Tokyo, Japan

[21] Appl. No.: 09/478,982

[22] Filed: Jan. 7, 2000

[30] Foreign Application Priority Data

May 31, 1999  [JP]  Japan ................... 11-151864

[51] Int. Cl.⁷ ...................................................... G02F 1/13
[52] U.S. Cl. ........................................ 349/2; 349/3
[58] Field of Search .................. 349/2, 3; 101/135, 101/489, DIG. 46; 347/135, 139, 140, 142, 232, 234, 239, 241; 355/32, 54, 85, 88, 99, 101

[56] References Cited

U.S. PATENT DOCUMENTS

| | | | |
|---|---|---|---|
| 3,665,856 | 5/1972 | Heller, Jr. .................................. | 101/426 |
| 4,547,783 | 10/1985 | Watanabe ............................ | 346/76 PH |
| 4,810,058 | 3/1989 | Sangyoji et al. ...................... | 350/331 R |
| 4,838,652 | 6/1989 | Inaba et al. ........................... | 350/331 R |
| 4,850,675 | 7/1989 | Hatanaka et al. .................... | 350/331 R |
| 5,059,000 | 10/1991 | Kaneko et al. ......................... | 350/351 |
| 5,122,831 | 6/1992 | Suzuki .................................... | 355/37 |
| 5,189,468 | 2/1993 | Sato et al. .............................. | 355/88 |
| 5,757,410 | 5/1998 | Sunagawa et al. ..................... | 347/239 |
| 5,877,844 | 3/1999 | Matsumoto .............................. | 355/35 |
| 5,933,183 | 8/1999 | Enomoto et al. ....................... | 347/241 |
| 5,973,765 | 10/1999 | Uchiyama et al. ..................... | 355/40 |

FOREIGN PATENT DOCUMENTS 2-169271  6/1990  Japan .
4-241965  8/1992  Japan .

*Primary Examiner*—Kenneth Parker
*Assistant Examiner*—Mike Qi

[57] ABSTRACT

Trichromatic light exposed through a liquid crystal panel upon which liquid crystal shutter elements are two-dimensionally arranged is exposed so as to form an image in the same position on a photosensitive recording medium by moving the photosensitive recording medium opposite the array of liquid crystal shutter elements. For example, the liquid crystal panel is provided with red liquid crystal shutter element rows, green liquid crystal shutter element rows, and blue liquid crystal shutter element rows, each arrayed with m liquid crystal shutter elements in a direction perpendicular to a direction of conveyance of the photosensitive recording medium, these element rows being arranged repetitively in an appropriate order at constant pitch such that (n+2) rows are arranged in the direction of conveyance of the photosensitive recording medium. Exposure through the liquid crystal shutter elements is activated every time the photosensitive recording medium is conveyed by the same distance as the constant pitch.

3 Claims, 8 Drawing Sheets

Δ = 0.05W ~ 0.3W

OPTICAL COLOR PRINTER ASSEMBLY

BACKGROUND OF THE INVENTION

1. Field of the Invention

The present invention relates to an optical color printer assembly for printing a color image on photosensitive recording paper by exposing three colors, namely red, green, and blue, by means of liquid crystal shutter elements which open and close when subjected to image data.

2. Description of the Related Art

Generally, in an optical printer assembly for printing an image on photographic recording paper by exposure to light by means of liquid crystal shutter elements which open and close when subjected to image data, a number of liquid crystal cells (liquid crystal shutter elements) are arranged two-dimensionally on a liquid crystal panel, as in the liquid crystal printer assembly disclosed in Japanese Patent Laid-Open No. HEI 4-241965, for example. Japanese Patent Laid-Open No. HEI 2-169271, for example, is also conventionally known as a means of exposing in the same position the three colors, namely red, green, and blue, required in an optical color printer assembly (a liquid crystal color printer assembly).

That is, in the liquid crystal color printer assembly disclosed in the above laid-open patent three types of monochrome light sources R, G, and B are used in which red light, green light, or blue light constituting a light source radiate downwards, and these three types of monochrome light sources are arranged in three positions spaced in a direction of motion of photosensitive paper (a photographic recording medium) disposed below so that the three types of monochrome light sources meet in a straight line at the focus below. Liquid crystal shutters for trichromatic separation consisting of three types of liquid crystal shutters for R, G and B opening sequentially at predetermined intervals in response to color change signals are disposed on a plane crossing the optical path of the monochrome light at a lower position and are arranged so as to be spaced in the direction of motion of the photo-sensitive paper so as to allow only red light, green light, or blue light to pass through. A number of liquid crystal shutter elements opening for the exact exposure time required at a given shutter element position for a given color in response to image signals synchronized with the opening time of each of the R, G and B liquid crystal shutters are positioned at the height of the above-mentioned focus of the light, being disposed in a line perpendicular to the direction of motion of the photosensitive paper. The photosensitive paper is disposed on a plane below these shutter elements and is fed continuously and at constant speed in a direction perpendicular to the above-mentioned line so as to be synchronized with the transmission time for one line of R, G and B image signals.

In the conventional construction, the above-mentioned liquid crystal shutters for trichromatic separation receive color change signals and, for example, each opens for a predetermined time in RGB order, sequentially allowing the passage of only red, green, or blue light towards the above-mentioned rectilinear focus along mutually different paths. The rectilinear liquid crystal shutter elements (shutter arrays) receive RGB image signals synchronized with the transit time for each of the above colored lights and open for the exact exposure time required at a given shutter element position for a given color, sequentially allowing the passage of red, green, or blue light to the photosensitive body in a line dot pattern.

At that time, because the photosensitive body is conveyed continuously and at constant speed by a conveying means in a direction perpendicular to the line so as to be synchronized with the transmission time for one line of trichromatic RGB image signals and, as explained above, the incident paths of R, G, and B into the liquid crystal shutter array are different, one line of trichromatic overlaid exposure is performed by first exposing red light, for example, in a line dot pattern slightly ahead of the above-mentioned linear focus in the direction of motion of the photosensitive paper, next exposing green light on the line dot patterned previously exposed portion of the photosensitive paper which has been conveyed to be directly below the linear focus during the previous exposure time, and further exposing the previously photosensitized portion to blue light aft of the linear focus.

However, because the conventional assembly uses three types of monochrome light sources and two layers of liquid crystal shutters, there is a large number of parts, leading to enlargement of the assembly. Furthermore, because two layers of liquid crystal shutters are used, the permeability of the light from the light sources deteriorates and the quantity of light is reduced, and thus one problem has been the necessity to extend exposure time to account for insufficient light, leading to a reduction in printing speed. Furthermore, because the liquid crystal elements have incident angle dependency making the permeability of light vary according to the angle of incidence of the light, another problem has been the difficulty in adjusting the angle of incidence of the three colors of light, facilitating dislocation and blurring of the focus on the image.

SUMMARY OF THE INVENTION

The present invention aims to solve such problems existing in the conventional art and an object of the present invention is to provide a compact, high-speed, high-quality optical color printer assembly with an inexpensive construction.

In order to achieve the above object, according to one aspect of the present invention, there is provided an optical printer assembly including:

a liquid crystal panel having liquid crystal shutter elements disposed in a two-dimensional pattern for selectively transmitting light from a light source by opening and closing pixels based on image information;

an optical image forming means for transferring light from the light source which has passed through the liquid crystal panel onto a photosensitive recording medium and forming an image; and a medium conveying means for conveying the photosensitive recording medium to a developing means for developing, the liquid crystal panel being provided with red liquid crystal shutter element rows, green liquid crystal shutter element rows, and blue liquid crystal shutter element rows, each arrayed with m liquid crystal shutter elements in a direction perpendicular to a direction of conveyance of the photosensitive recording medium, where the number of effective recording pixels of the image which is the subject of printing is n in the direction of conveyance of the photosensitive recording medium, and m in the direction perpendicular to the direction of conveyance of the photo-sensitive recording medium, red liquid crystal shutter element rows, green liquid crystal shutter element rows, and blue liquid crystal shutter element rows being arranged repetitively in an appropriate order at constant pitch such that (n+2) rows are arranged in the direction of conveyance of the photosensitive recording medium, and exposure through the liquid crystal shutter elements being activated every time the photosensitive recording medium is conveyed by the same distance as the constant pitch.

According to another aspect of the present invention, there is provided an optical printer assembly including:

a liquid crystal panel having liquid crystal shutter elements disposed in a two-dimensional pattern for selectively transmitting light from a light source by opening and closing pixels based on image information;

an optical image forming means for transferring light from the light source which has passed through the liquid crystal panel onto a photosensitive recording medium and forming an image; and a medium conveying means for conveying the photosensitive recording medium to a developing means for developing, the liquid crystal panel being provided with red liquid crystal shutter element rows, green liquid crystal shutter element rows, and blue liquid crystal shutter element rows, each arrayed with m liquid crystal shutter elements in a direction perpendicular to a direction of conveyance of the photosensitive recording medium, where the number of effective recording pixels of the image which is the subject of printing is n in the direction of conveyance of the photosensitive recording medium (where $n \geq 2$), and m in the direction perpendicular to the direction of conveyance of the photosensitive recording medium, red liquid crystal shutter element rows, green liquid crystal shutter element rows, and blue liquid crystal shutter element rows being arranged repetitively in an appropriate order at a pitch of two pixel widths such that when the number of recording pixels is even, $(2+n/2)$ rows of liquid crystal shutter elements are disposed, and when the number of recording pixels is odd, $[2+(n+1)/2]$ rows of liquid crystal shutter elements are disposed, and exposure through the liquid crystal shutter elements being activated every time the photosensitive recording medium is conveyed by a distance of one pixel width.

According to yet another aspect of the present invention, there is provided an optical printer assembly including:

a liquid crystal panel having liquid crystal shutter elements disposed in a two-dimensional pattern for selectively transmitting light from a light source by opening and closing pixels based on image information;

an optical image forming means for transferring light from the light source which has passed through the liquid crystal panel onto a photosensitive recording medium and forming an image; and a medium conveying means for conveying the photosensitive recording medium to a developing means for developing, the liquid crystal panel being provided with red liquid crystal shutter element rows, green liquid crystal shutter element rows, and blue liquid crystal shutter element rows, each arrayed with m/2 liquid crystal shutter elements in a direction perpendicular to a direction of conveyance of the photosensitive recording medium, where the number of effective recording pixels of the image which is the subject of printing is m in the direction perpendicular to the direction of conveyance of the photosensitive recording medium (where $m \geq 2$), two rows each of these red liquid crystal shutter element rows, green liquid crystal shutter element rows, and blue liquid crystal shutter element rows being arranged in an appropriate order in a zigzag pattern at a pitch P in the direction of conveyance of the photosensitive recording medium, the pitch between each of the liquid crystal shutter elements in the direction perpendicular to the direction of conveyance of the photosensitive recording medium straddling adjacent liquid crystal shutter element rows being set to a constant value such that 5 to 30 percent of the width of the liquid crystal shutter elements overlaps, the exposure for each liquid crystal shutter row based on line data from an auxiliary scanning direction of the image information being performed every time the photosensitive recording medium is conveyed by a distance of one pixel width for the first liquid crystal shutter element row, and performed after a delay of P/V from the commencement of exposure of image data in the liquid crystal shutter element row immediately preceding (where V is the speed of conveyance of the photosensitive recording medium) for the second and subsequent liquid crystal shutter element rows.

DETAILED DESCRIPTION OF THE PREFERRED EMBODIMENTS

Embodiment 1

Figure 1:
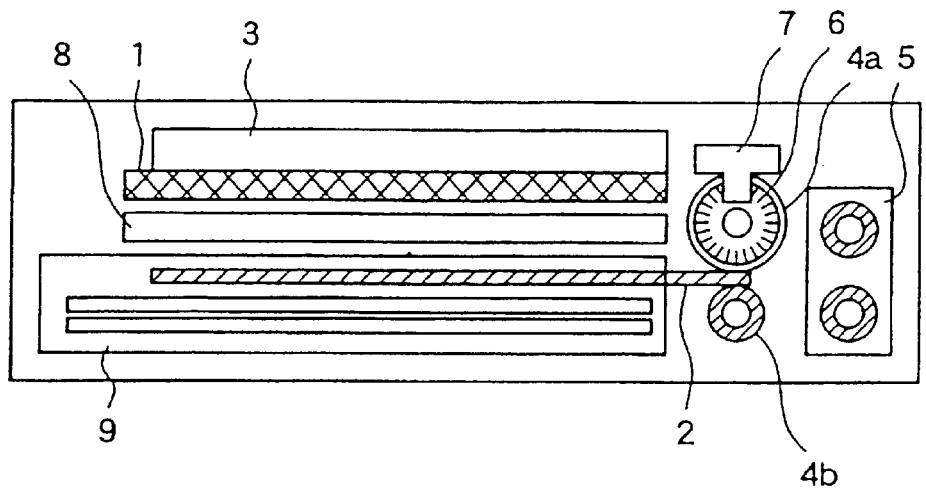
FIG. 1 is a structural diagram of a printer assembly in Embodiment 1 of the present invention.

FIG. 1 is a structural diagram showing an example of a color printer assembly according to the present invention. In the drawing, 1 is a liquid crystal panel, 2 is a photosensitive recording medium, 3 is a back light being a light source, 8 is an optical image forming means for forming light which has passed through the liquid crystal panel 1 into an image, 9 is a cassette housing the photosensitive recording medium 2, 4a and 4b are medium conveying rollers for conveying the photosensitive medium to a developing means 5, 6 is a code wheel mounted on the shaft of one of the medium conveying rollers 4a, the conveyed distance of the photosensitive recording medium 2 being monitored by means of a computing circuit (not shown) by reading the number of slits moved on the code wheel 6 with a medium conveyance distance detector 7.

Figure 2:
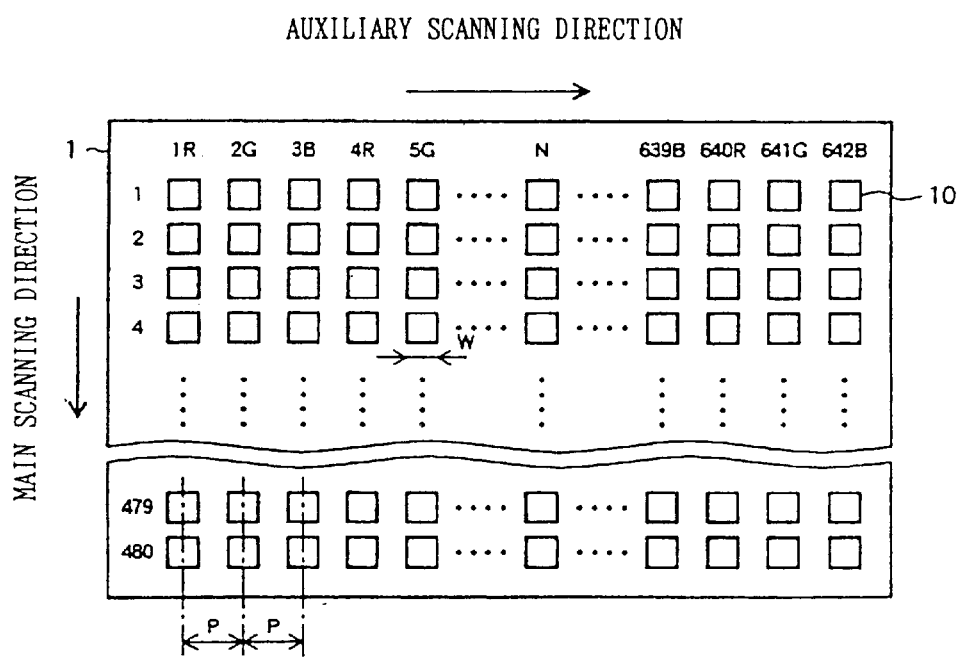
FIG. 2 is a diagram showing an arrangement of liquid crystal elements in a liquid crystal panel in Embodiment 1 of the present invention.

FIG. 2 is a diagram showing the arrangement of liquid crystal elements 10 on the liquid crystal panel 1. In this embodiment, a case where the image subjected to printing is VGA size (in which the number of effective recording pixels is 480×640) will be described as an example. Furthermore, this embodiment is given to have an array of 640 dots in an auxiliary scanning direction, which is the direction of conveyance of the photosensitive recording medium 2 (hereinafter medium conveyance direction), and 480 dots in a main scanning direction, which is a direction perpendicular to the direction of conveyance of the medium.

In FIG. 2, 480 liquid crystal shutter elements 10 are disposed in the main scanning direction, and (640+2) liquid crystal shutter element rows of each color are disposed at a pitch P of one pixel in the auxiliary scanning direction being an appropriate constant dimension in a repetitive sequence consisting of a red liquid crystal shutter element row, a green liquid crystal shutter element row, and a blue liquid crystal shutter element row. Consequently, the final (642nd) row is a blue liquid crystal shutter element row.

Moreover, in FIG. 2, the numerals in the auxiliary scanning direction represent the row numbers of the liquid crystal shutter elements, and the letters R, G, and B beside the row numbers represent red liquid crystal shutter element rows, green liquid crystal shutter element rows, and blue liquid crystal shutter element rows, respectively.

Next, the operation of Embodiment 1 will be explained based on FIG. 3a to 3c.

During the printing operation, light from the back light 3 is exposed on the photosensitive recording medium 2 by selectively opening and closing the liquid crystal shutter elements 10 based on an image signal to form an exposed image 11 on the photosensitive recording medium 2 based on the image signal.

Figure 3A:
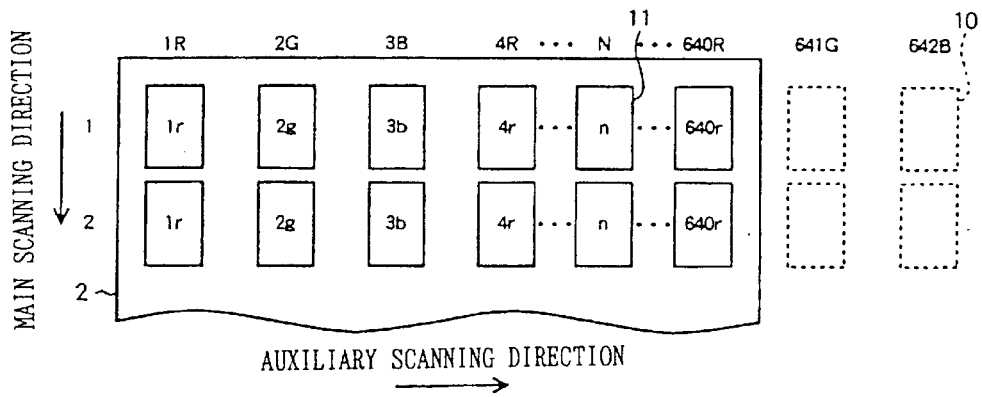
FIG. 3a is a diagram explaining the first exposure operation of the optical printer in Embodiment 1 of the present invention.
Figure 3B:
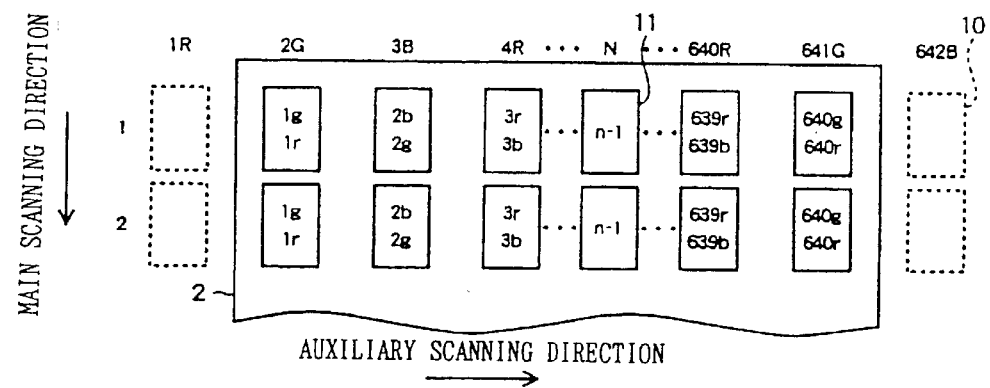
FIG. 3b is a diagram explaining the second exposure operation of the optical printer in Embodiment 1 of the present invention.
Figure 3C:
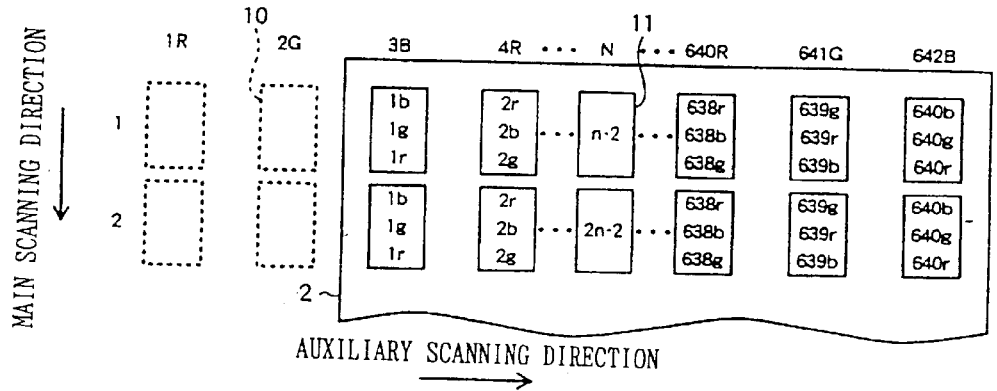
FIG. 3c is a diagram explaining the third exposure operation of the optical printer in Embodiment 1 of the present invention.

FIG. 3a is a diagram showing the first exposure operation. The numerical values within the exposed image 11 in the drawing represent the image data of the exposed image 11 formed on the photosensitive recording medium in the auxiliary scanning direction and correspond to the row data of the image information in the auxiliary scanning direction, and the letters r, g, and b beside the numerical values represent the image data of the red liquid crystal shutter elements, green liquid crystal shutter elements, and blue liquid crystal shutter elements, respectively. For example, 1r is the red signal data from the first row of the image information in the auxiliary scanning direction, 2g is the green signal data from the second row of the image information in the auxiliary scanning direction, 3b is the blue signal data from the third row of the image information in the auxiliary scanning direction, and similarly, n is the image data from the nth row of the image information in the auxiliary scanning direction.

As shown in FIG. 3a, in the first exposure operation, each liquid crystal shutter element row from liquid crystal shutter element row 1R in the first row in the auxiliary scanning direction to liquid crystal shutter element row 640R in the 640th row is activated according to the row data of the image information in the auxiliary scanning direction, corresponding to the color in its respective liquid crystal shutter element row, but liquid crystal shutter element row 641G in the 641st row in the auxiliary scanning direction and liquid crystal shutter element row 642B in the 642nd row in the auxiliary scanning direction, are not activated.

In other words, through liquid crystal shutter element row 1R in the first row in the liquid crystal panel 1, an image based on red data 1r from the first row of the image information in the auxiliary scanning direction is exposed on the photosensitive recording medium 2, and through liquid crystal shutter element row N in the nth row in the liquid crystal panel 1, an image based on data n from the nth row of the image information in the auxiliary scanning direction is exposed thereon.

When the first exposure operation is completed, the photosensitive recording medium 2 is conveyed in the auxiliary scanning direction by the medium conveying rollers 4a and 4b, which are driven by a driving means (not shown), the number of slits moved on the code wheel 6 is read by the medium conveyance distance detector 7, the conveyed distance L of the photosensitive recording medium 2 (hereinafter conveyed distance) is monitored by the computing circuit (not shown), and the driving of the medium conveying rollers 4a and 4b is stopped at the point where L=P. By this conveyance, the photosensitive recording medium 2 is conveyed exactly by the length of one pixel pitch P in the auxiliary scanning direction.

At this time, the exposed image 11 on the photosensitive recording medium 2 based on image data 1r from the first row in the auxiliary scanning direction is moved to a position opposite liquid crystal shutter element row 2G in the second row on the liquid crystal panel 1 in the auxiliary scanning direction. In other words, the exposed image 11 on the photosensitive recording medium 2 based on image data n from the nth row in the auxiliary scanning direction is moved to a position opposite liquid crystal shutter element row (N+1) in the (n+1)th row on the liquid crystal panel 1 in the auxiliary scanning direction.

Next, the second exposure operation will be explained based on FIG. 3b.

In the second exposure operation, each liquid crystal shutter element row from liquid crystal shutter element row 2G in the second row on the liquid crystal panel 1 in the auxiliary scanning direction to liquid crystal shutter element row 641G in the 641st row is activated according to the image data (n−1) from the (n−1)th row of the image information in the auxiliary scanning direction corresponding to the color in its respective liquid crystal shutter element row.

In other words, green liquid crystal shutter element row 2G in the second row on the liquid crystal panel 1 in the auxiliary scanning direction is activated based on image data 1g corresponding to green image information from the first row of the image information in the auxiliary scanning direction, and an exposed image 11 based on image data 1g is exposed on the photosensitive recording medium in the same place as the exposed image 11 based on image data 1r exposed in the first exposure operation. In a similar manner, a dichromatic overlaid exposure is subsequently performed by activating liquid crystal shutter element row N in the nth row on the liquid crystal panel 1 based on image data (n−1) from the (n−1)th row of the image information in the auxiliary scanning direction, and exposing an exposed image 11 based on image data (n−1) from the (n−1)th row in the auxiliary scanning direction on the photosensitive recording medium in the same place as the exposed image 11 exposed by liquid crystal shutter element row (N−1) on the liquid crystal panel 1 in the first exposure operation, which is a different color from that of liquid crystal shutter element row N.

When the second exposure operation is completed, the photosensitive recording medium 2 is conveyed in the auxiliary scanning direction by the medium conveying rollers 4a and 4b, which are driven by a driving means (not shown), the number of slits moved on the code wheel 6 is read by the medium conveyance distance detector 7, the conveyed distance L is monitored by the computing circuit (not shown), and the driving of the medium conveying rollers 4a and 4b is stopped at the point where L=P. By this conveyance, the photosensitive recording medium 2 is again conveyed exactly by the length of one pixel pitch P in the auxiliary scanning direction.

At this time, the exposed image 11 on the photosensitive recording medium 2 based on image data 1r and 1g in the first row in the auxiliary scanning direction is moved to a position opposite liquid crystal shutter element row 3B in the third row on the liquid crystal panel 1 in the auxiliary scanning direction. In other words, the exposed image 11 on the photosensitive recording medium 2 based on image data n from the nth row in the auxiliary scanning direction is moved to a position opposite liquid crystal shutter element row (N+2) in the (n+2)th row on the liquid crystal panel 1 in the auxiliary scanning direction.

Next, the third exposure operation will be explained based on FIG. 3c.

In the third exposure operation, each liquid crystal shutter element row from liquid crystal shutter element row 3B in the third row on the liquid crystal panel 1 in the auxiliary scanning direction to liquid crystal shutter element row 642B in the 642nd row is activated according to the image data (n−2) from the (n−2)th row of the image information in the auxiliary scanning direction, corresponding to the color in its respective liquid crystal shutter element row.

In other words, blue liquid crystal shutter element row 3B in the third row on the liquid crystal panel 1 in the auxiliary scanning direction is activated based on image data 1b corresponding to blue image information from the first row of the image information in the auxiliary scanning direction, and an image based on image data 1b is overlaid and exposed on the photosensitive recording medium 2 in the same place as the exposed images 11 exposed in the first and second exposure operations based on image data 1r and 1g, so that an image based on trichromatic image data is overlaid and exposed on the first row of the photosensitive recording medium 2.

In a similar manner, a trichromatic image data is subsequently overlaid and exposed on the nth row of the photosensitive recording medium 2 by activating liquid crystal shutter element row N in the nth row on the liquid crystal panel 1 based on image data (n−2) from the (n−2)th row of the image information in the auxiliary scanning direction, and overlaying and exposing an image 11 based on image data (n−2) from the (n−2)th row in the auxiliary scanning direction on the photosensitive recording medium in the same place as the exposed image 11 formed by liquid crystal shutter element rows (N−1) and (N−2) on the liquid crystal panel 1 in the first and second exposure operations, which are a different color from that of liquid crystal shutter element row N.

Then, when the third exposure operation is completed, the photosensitive recording medium 2 is conveyed to the developing means 5 by the medium conveying rollers 4a and 4b, which are driven by a driving means (not shown), where a developing operation is performed by the developing means 5, enabling a color printed image to be obtained.

Moreover, a stepping motor may be used in the driving means for the medium conveying rollers 4a and 4b as a means of monitoring the conveyed distance L, whereby the conveyed distance L can be monitored by counting the number of pulses of the stepping motor required to convey the photosensitive recording medium 2 exactly by the amount of one pixel pitch P.

Furthermore, the order of arrangement of each colored liquid crystal shutter element row in the auxiliary scanning direction is not limited to the above, the three colored liquid crystal shutter element rows, namely the red liquid crystal shutter element row, the green liquid crystal shutter element row, and the blue liquid crystal shutter element row may be arranged repetitively in any appropriate order.

In this embodiment, because the liquid crystal elements 10 on the liquid crystal panel 1 are arranged repetitively in appropriate sequences of red liquid crystal shutter element rows, green liquid crystal shutter element rows, and blue liquid crystal shutter element rows in the auxiliary scanning direction, and (n+2) rows are disposed in the auxiliary scanning direction, where n is the maximum number of recording pixels in the image information in the auxiliary scanning direction, and the photosensitive recording medium 2 is moved by a distance of one pixel pitch P in the auxiliary scanning direction after each exposure operation in the above manner, it is possible to overlay and expose an image based on trichromatic image data. Consequently, a color image having a resolution three times greater than the resolution of the liquid crystal panel 1 can be obtained simply by the operation of feeding the photosensitive recording medium 2 in the auxiliary scanning direction without having to use three types of light sources and without having to use two liquid crystal panels, enabling a high-quality printed image to be obtained by an inexpensive and comparatively compact assembly. Furthermore, because it is sufficient to use one liquid crystal panel and the entire exposure operation is completed in three exposure operations, the permeability of the light from the light source is improved and exposure time can be reduced, shortening the printing time.

Embodiment 2

Embodiment 2 of the present invention will be explained based on FIGS. 4 to 5f.

Figure 4:
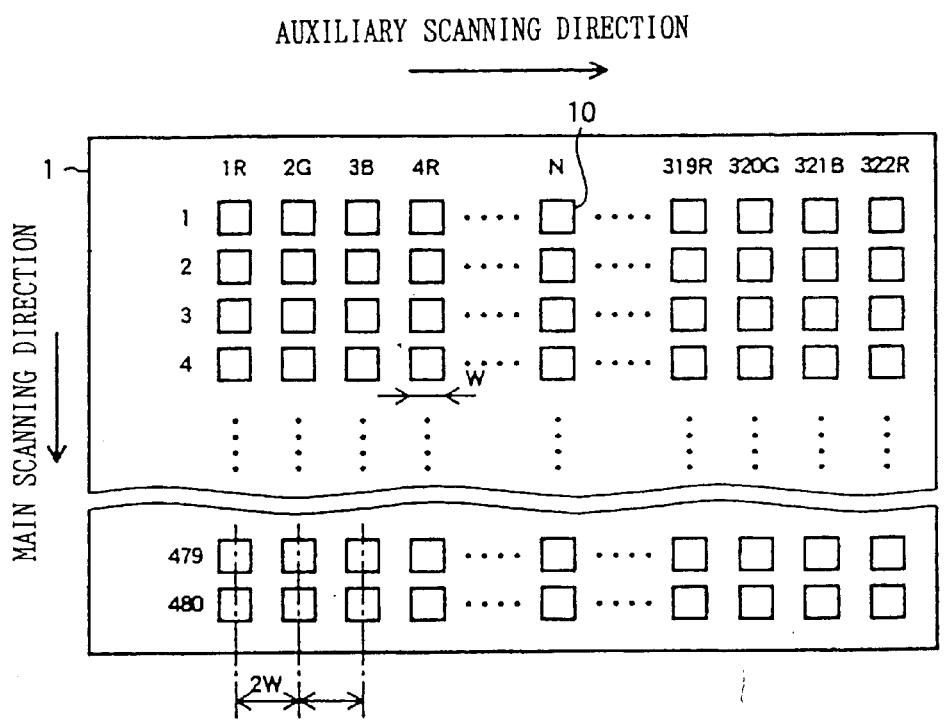
FIG. 4 is a diagram showing an arrangement of liquid crystal elements in a liquid crystal panel in Embodiment 2 of the present invention.

FIG. 4 is a diagram showing the arrangement of liquid crystal elements 10 on the liquid crystal panel 1. Here, a case where the image subjected to printing is VGA size (in which the number of effective recording pixels is 480×640) will be described as an example. Furthermore, this embodiment is given to have an array of 640 dots in an auxiliary scanning direction, which is the direction of conveyance of the medium, and 480 dots in a main scanning direction, which is a direction perpendicular to the direction of conveyance of the medium.

In FIG. 4, W represents the dimension of each of the liquid crystal shutter elements 10 in the width direction, and 480 liquid crystal shutter elements 10 are disposed in the main scanning direction. Since the number recording pixels in the auxiliary scanning direction is 640, which is an even number, there are (2+640/2)=322 rows of liquid crystal shutter elements disposed in a repeated sequence consisting of a red liquid crystal shutter element row, a green liquid crystal shutter element row, and a blue liquid crystal shutter element row, at a pitch of two pixel widths, in other words, 2W. Consequently, the final (322nd) row is a red liquid crystal shutter element row.

Moreover, the numerals in the drawing represent the row numbers of the liquid crystal shutter elements in the auxiliary scanning direction, and the letters R, G, and B beside the row numbers represent red liquid crystal shutter element rows, green liquid crystal shutter element rows, and blue liquid crystal shutter element rows, respectively. Furthermore, because the overall construction of the assembly in Embodiment 2 is the same as for Embodiment 1 in FIG. 1 which was explained above, duplicate explanation will be omitted here.

Next, the operation of Embodiment 1 will be explained based on FIGS. 5a to 5b.

During the printing operation, light from the back light 3 is exposed on the photosensitive recording medium 2 by selectively opening and closing the liquid crystal shutter elements 10 based on an image signal to form an exposed image 11. FIG. 5a is a diagram showing the first exposure operation. The numerical values within the exposed image 11 in the drawings represent the image data of the exposed image 11 formed on the photosensitive recording medium in the auxiliary scanning direction and correspond to the row data of the image information in the auxiliary scanning direction, and the letters r, g, and b beside the numerical values represent the image data of the red liquid crystal shutter elements, green liquid crystal shutter elements, and blue liquid crystal shutter elements, respectively. That is to say that 2r is the red signal data from the second row of the image information in the auxiliary scanning direction, 4g is the green signal data from the fourth row of the image information in the auxiliary scanning direction, 6b is the blue signal data from the sixth row of the image information in the auxiliary scanning direction, and similarly, n is the image data from the nth row of the image information in the auxiliary scanning direction, respectively.

Figure 5A:
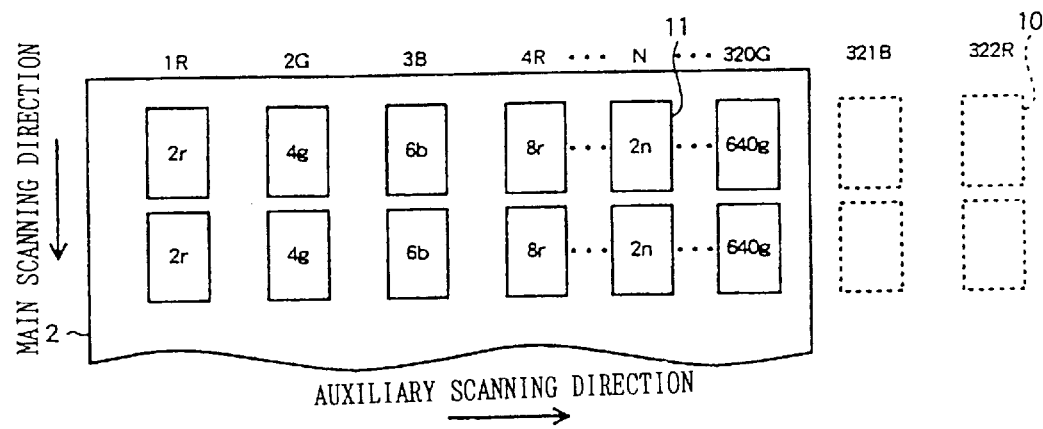
FIG. 5a is a diagram explaining the first exposure operation of the optical printer in Embodiment 2 of the present invention.
Figure 5B:
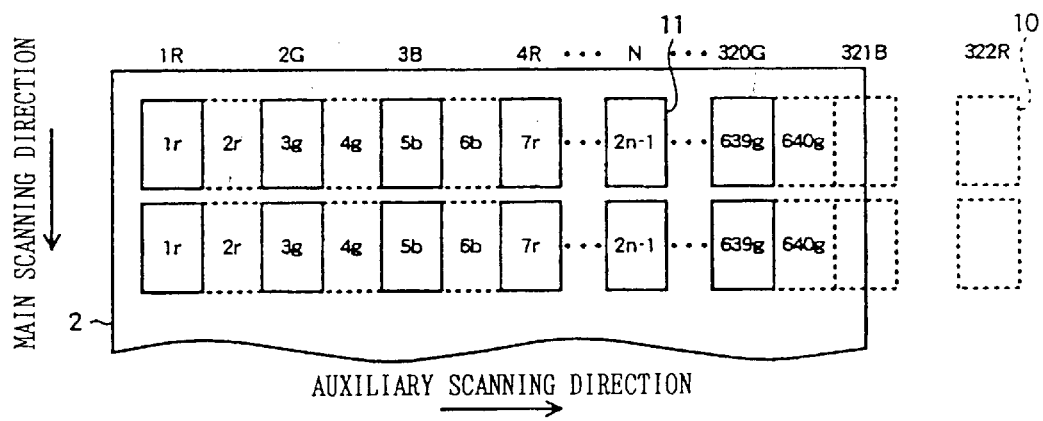
FIG. 5b is a diagram explaining the second exposure operation of the optical printer in Embodiment 2 of the present invention.

As shown in FIG. 5a, in the first exposure operation, each liquid crystal shutter element row from liquid crystal shutter element row 1R in the first row in the auxiliary scanning direction to liquid crystal shutter element row 320G in the 320th row is activated according to the row data of the image information in the auxiliary scanning direction whose value is twice that of its respective liquid crystal shutter element row number and which corresponds to the color in its respective liquid crystal shutter element row, but liquid crystal shutter element rows 321B and 322R, which are the 321st and 322nd rows in the auxiliary scanning direction, are not activated.

In other words, through liquid crystal shutter element row 1R in the first row in the liquid crystal panel 1, an image based on red data 2r from the second row of the image information in the auxiliary scanning direction is exposed on the photosensitive recording medium 2, and through liquid crystal shutter element row N in the nth row in the liquid crystal panel 1, an image based on image data 2n from the 2nth row of the image information in the auxiliary scanning direction, corresponding to the color of liquid crystal shutter element row N in the nth row, is exposed on the photosensitive recording medium 2.

When the first exposure operation is completed, the photosensitive recording medium 2 is conveyed in the auxiliary scanning direction by the medium conveying rollers 4a and 4b, which are driven by a driving means (not shown), the number of slits moved on the code wheel 6 is read by the medium conveyance distance detector 7, the conveyed distance L is monitored by the computing circuit (not shown), and the driving of the medium conveying rollers 4a and 4b is stopped at the point where L=W (one pixel width). By this conveyance, the photosensitive recording medium 2 is conveyed exactly by W which is one half of the pixel pitch (in other words, one pixel width).

At this time, the exposed image 11 on the photosensitive recording medium 2 based on image data 2r from the second row in the auxiliary scanning direction is moved to a position between liquid crystal shutter element row 1R in the first row and liquid crystal shutter element row 2G in the second row on the liquid crystal panel 1 in the auxiliary scanning direction. In other words, the exposed image 11 on the photosensitive recording medium 2 based on image data 2n from the 2nth row in the auxiliary scanning direction is moved to a position between liquid crystal shutter element row N in the nth row and liquid crystal shutter element row (N+1) in the (n+1)th row on the liquid crystal panel 1 in the auxiliary scanning direction.

Next, the second exposure operation will be explained based on FIG. 5b.

In the second exposure operation, liquid crystal shutter element rows from liquid crystal shutter element row 1R in the first row on the liquid crystal panel 1 in the auxiliary scanning direction to liquid crystal shutter element row 320G in the 320th row are used. Liquid crystal shutter element row N in the nth row in the auxiliary scanning direction is activated in accordance with data from the (2n−1)th row of the image data in the auxiliary scanning direction corresponding to the color of liquid crystal shutter element row N in the nth row.

In other words, red liquid crystal shutter element row 1R in the first row on the liquid crystal panel 1 in the auxiliary scanning direction is activated based on image data 1r corresponding to red image information from the first row of the image information in the auxiliary scanning direction, and green liquid crystal shutter element row 2G in the second row on the liquid crystal panel 1 in the auxiliary scanning direction is activated based on image data 3g corresponding to green image information from the third row of the image information in the auxiliary scanning direction. In a similar manner, a second exposed image 11 is subsequently formed next to the first exposed image 11 exposed in the first exposure operation without any gaps in the auxiliary scanning direction by activating liquid crystal shutter element row N in the nth row on the liquid crystal panel 1 based on image data (2n−1) from the (2n−1)th row of the image information in the auxiliary scanning direction, corresponding to the color of liquid crystal shutter element row N in the nth row.

After completion of the second exposure operation, the photosensitive recording medium 2 is again conveyed in the auxiliary scanning direction exactly by W which is one half of the pixel pitch (in other words, one pixel width) in the same manner as after completion of the first exposure operation.

At this time, the first exposed image 11 on the photosensitive recording medium 2 is moved to a position opposite the liquid crystal shutter element rows in the second and subsequent rows on the liquid crystal panel 1 in the auxiliary scanning direction, and the second exposed image 11 is moved to a position between each of the liquid crystal shutter element rows on the liquid crystal panel 1 in the auxiliary scanning direction.

Figure 5C:
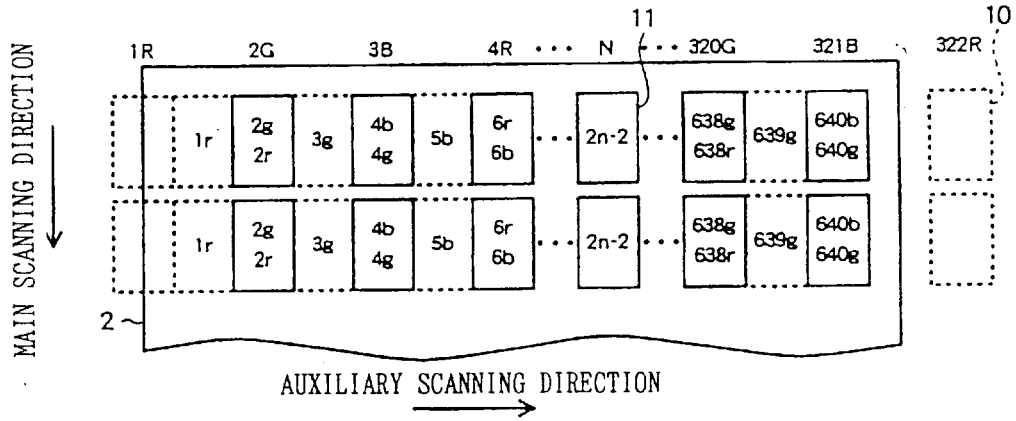
FIG. 5c is a diagram explaining the third exposure operation of the optical printer in Embodiment 2 of the present invention.

Next, the third exposure operation will be explained based on FIG. 5c.

In the third exposure operation, liquid crystal shutter element rows from liquid crystal shutter element row 2G in the second row on the liquid crystal panel 1 in the auxiliary scanning direction to liquid crystal shutter element row 321B in the 321st row are used. Liquid crystal shutter element row N in the nth row in the auxiliary scanning direction is activated in accordance with image data (2n−2) from the (2n−2)th row of the image data in the auxiliary scanning direction corresponding to the color of liquid crystal shutter element row N in the nth row.

In other words, green liquid crystal shutter element row 2G in the second row on the liquid crystal panel 1 in the auxiliary scanning direction is activated based on image data 2g corresponding to green image information from the second row of the image information in the auxiliary scanning direction, and blue liquid crystal shutter element row 3B in the third row on the liquid crystal panel 1 in the auxiliary scanning direction is activated based on image data 4b corresponding to blue image information from the fourth row of the image information in the auxiliary scanning direction. In a similar manner, a dichromatic exposed image 11 is subsequently formed on top of the image exposed in the first exposure operation by activating liquid crystal shutter element row N in the nth row on the liquid crystal panel 1 based on image data (2n−2) from the (2n−2)th row of the image information in the auxiliary scanning direction, corresponding to the color of liquid crystal shutter element row N in the nth row.

After completion of the third exposure operation, the photosensitive recording medium 2 is again conveyed in the auxiliary scanning direction exactly by W which is one half of the pixel pitch (in other words, one pixel width) in the same manner as after completion of the first and second exposure operations.

At this time, the exposed image 11 on the photosensitive recording medium 2 from the second exposure operation is moved to a position opposite the liquid crystal shutter element rows in the second and subsequent rows on the liquid crystal panel 1 in the auxiliary scanning direction, and the exposed image 11 from the first and third exposure operations is moved to a position between each of the liquid crystal shutter element rows on the liquid crystal panel 1 in the auxiliary scanning direction.

Figure 5D:
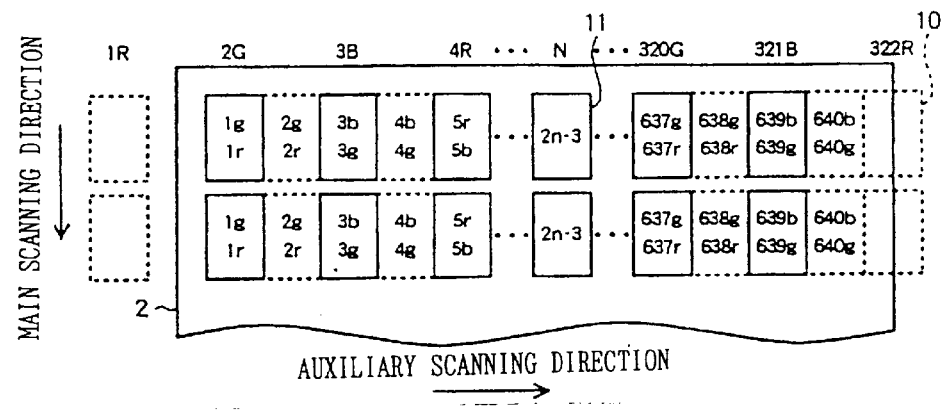
FIG. 5d is a diagram explaining the fourth exposure operation of the optical printer in Embodiment 2 of the present invention.

Next, the fourth exposure operation will be explained based on FIG. 5d.

In the fourth exposure operation, liquid crystal shutter element rows from liquid crystal shutter element row 2G in the second row on the liquid crystal panel 1 in the auxiliary scanning direction to liquid crystal shutter element row 321B in the 321st row are used. Liquid crystal shutter element row N in the nth row in the auxiliary scanning direction is activated in accordance with image data (2n−3) from the (2n−3)th row of the image data in the auxiliary scanning direction corresponding to the color of liquid crystal shutter element row N in the nth row.

In other words, green liquid crystal shutter element row 2G in the second row on the liquid crystal panel 1 in the auxiliary scanning direction is activated based on image data 1g corresponding to green image information from the first row of the image information in the auxiliary scanning direction, and blue liquid crystal shutter element row 3B in the third row on the liquid crystal panel 1 in the auxiliary scanning direction is activated based on image data 3b corresponding to blue image information from the third row of the image information in the auxiliary scanning direction.

In a similar manner, a dichromatic exposed image 11 is subsequently formed on top of the image exposed in the second exposure operation by activating liquid crystal shutter element row N in the nth row on the liquid crystal panel 1 based on image data (2n−3) from the (2n−3)th row of the image information in the auxiliary scanning direction, corresponding to the color of liquid crystal shutter element row N in the nth row.

After completion of the fourth exposure operation, the photosensitive recording medium 2 is again conveyed in the auxiliary scanning direction exactly by W which is one half of the pixel pitch (in other words, one pixel width) in the same manner as after completion of the previous exposure operations, and then the fifth exposure operation commences.

Figure 5E:
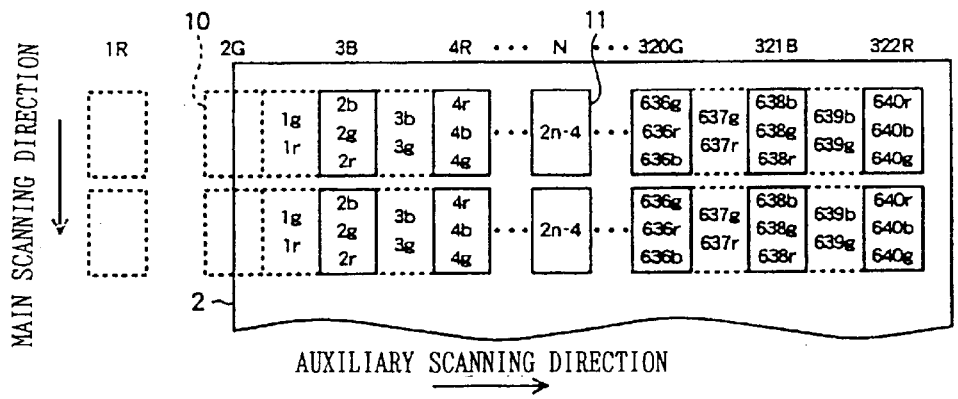
FIG. 5e is a diagram explaining the fifth exposure operation of the optical printer in Embodiment 2 of the present invention.

As shown in FIG. 5e, in the fifth exposure operation, liquid crystal shutter element rows from liquid crystal shutter element row 3B in the third row on the liquid crystal panel 1 in the auxiliary scanning direction to liquid crystal shutter element row 322R in the 322nd row are used. Liquid crystal shutter element row N in the nth row in the auxiliary scanning direction is activated in accordance with image data (2n−4) from the (2n−4)th row of the image data in the auxiliary scanning direction corresponding to the color of liquid crystal shutter element row N in the nth row.

In other words, blue liquid crystal shutter element row 3B in the third row on the liquid crystal panel 1 in the auxiliary scanning direction is activated based on image data 2b corresponding to blue image information from the second row of the image information in the auxiliary scanning direction, and red liquid crystal shutter element row 4R in the fourth row on the liquid crystal panel 1 in the auxiliary scanning direction is activated based on image data 4r corresponding to red image information from the fourth row of the image information in the auxiliary scanning direction. In a similar manner, a trichromatic exposed image 11 is subsequently formed on top of the image exposed in the first and third exposure operations by activating liquid crystal shutter element row N in the nth row on the liquid crystal panel 1 based on image data (2n−4) from the (2n−4)th row of the image information in the auxiliary scanning direction, corresponding to the color of liquid crystal shutter element row N in the nth row.

After completion of the fifth exposure operation, the photosensitive recording medium 2 is again conveyed in the auxiliary scanning direction exactly by W which is one half of the pixel pitch (in other words, one pixel width) in the same manner as after completion of the previous exposure operations, and then the sixth exposure operation commences.

Figure 5F:
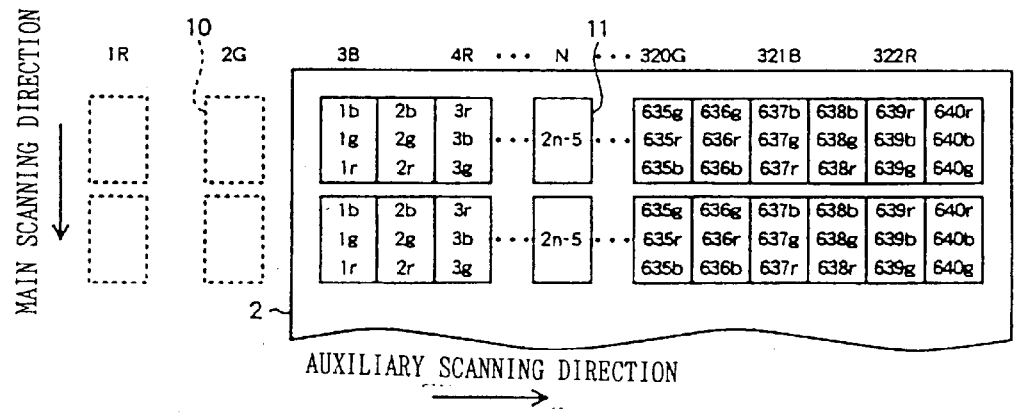
FIG. 5f is a diagram explaining the sixth exposure operation of the optical printer in Embodiment 2 of the present invention.

As shown in FIG. 5f, in the sixth exposure operation, liquid crystal shutter element rows from liquid crystal shutter element row 3B in the third row on the liquid crystal panel 1 in the auxiliary scanning direction to liquid crystal shutter element row 322R in the 322nd row are used. Liquid crystal shutter element row N in the nth row in the auxiliary scanning direction is activated in accordance with data (2n−5) from the (2n−5)th row of the image data in the auxiliary scanning direction corresponding to the color of liquid crystal shutter element row N in the nth row.

In other words, blue liquid crystal shutter element row 3B in the third row on the liquid crystal panel 1 in the auxiliary scanning direction is activated based on image data 1b corresponding to blue image information from the first row of the image information in the auxiliary scanning direction, and red liquid crystal shutter element row 4R in the fourth row on the liquid crystal panel 1 in the auxiliary scanning direction is activated based on image data 3r corresponding to red image information from the third row of the image information in the auxiliary scanning direction. In a similar manner, a trichromatic exposed image 11 is subsequently formed on top of the image exposed in the second and fourth exposure operations by activating liquid crystal shutter element row N in the nth row on the liquid crystal panel 1 based on data (2n–5) from the (2n–5)th row of the image information in the auxiliary scanning direction, corresponding to the color of liquid crystal shutter element row N in the nth row.

When the sixth exposure operation is completed, the photosensitive recording medium 2 is conveyed to the developing means 5 by the medium conveying rollers 4a and 4b, which are driven by a driving means (not shown), where a developing operation is performed by the developing means 5, enabling a color printed image to be obtained.

In this embodiment, a case has been explained in which the maximum number of recording pixels in the auxiliary scanning direction of the image information which is the subject of printing, namely n ($n \geq 2$), is an even number, but when n is an odd number, [2+(n−1)/2] rows of liquid crystal shutter element rows of each color, namely red liquid crystal shutter element rows, green liquid crystal shutter element rows, and blue liquid crystal shutter element rows, may be repetitively disposed in any appropriate order at a pitch 2W of two pixel widths.

In this embodiment, because the liquid crystal elements 10 on the liquid crystal panel 1 are arranged repetitively in appropriate sequences of liquid crystal shutter element rows of each color in the auxiliary scanning direction, namely red liquid crystal shutter element rows, green liquid crystal shutter element rows, and blue liquid crystal shutter element rows, and (2+n/2) rows are disposed at a pitch of two pixel widths in the auxiliary scanning direction, where n is the maximum number of recording pixels in the image information in the auxiliary scanning direction, and the photosensitive recording medium 2 is moved by a distance of W, which is one half of the pixel pitch (in other words, one pixel width), in the auxiliary scanning direction after each exposure operation in the above manner, it is possible to overlay and expose trichromatic image data in six exposure operations. Consequently, an color image having a resolution six times greater than the resolution of the liquid crystal panel 1 can be obtained simply by the operation of feeding the photosensitive recording medium 2 in the auxiliary scanning direction without having to use three types of light source and without having to use two liquid crystal panels, enabling black stripe in the auxiliary scanning direction due to non-aperture portions on the liquid crystal panel 1 to be eliminated. Consequently, a high-quality printed image can be obtained by an inexpensive and comparatively compact assembly. Furthermore, because it is sufficient to use one liquid crystal panel and the entire exposure operation is designed to be completed in six exposure operations, the permeability of the light from the light source is improved and exposure time can be reduced, shortening the printing time.

Embodiment 3

Embodiment 3 of the present invention will be explained based on FIGS. 6a, 6b, 7, and 8.

Figure 6A:
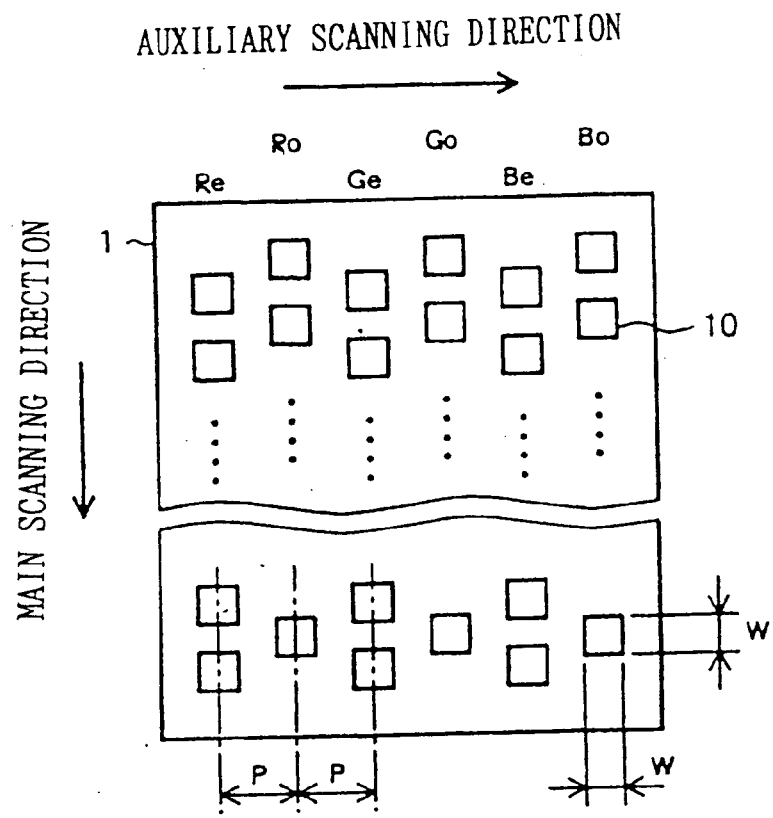
FIG. 6a is a diagram showing an overall arrangement of liquid crystal shutter elements in a liquid crystal panel in Embodiment 3 of the present invention.
Figure 6B:
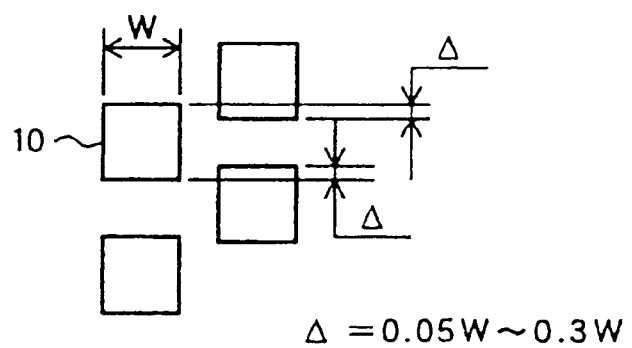
FIG. 6b is a diagram explaining the pitch between the liquid crystal shutter elements in a main scanning direction in Embodiment 3 of the present invention.
Figure 7:
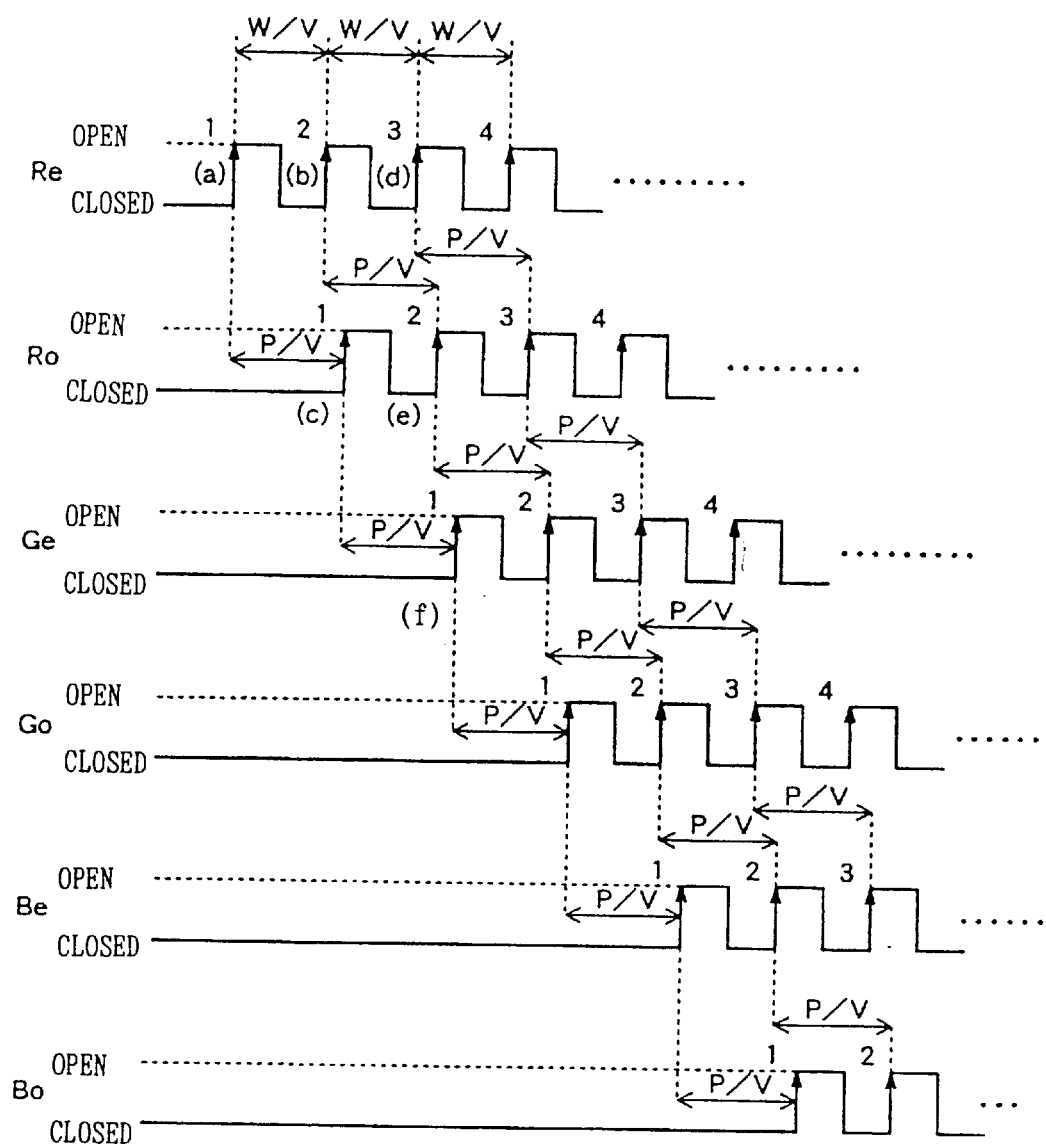
FIG. 7 is a timing chart of the activation of liquid crystal elements during the exposure operation in Embodiment 3 of the present invention.
Figure 8:
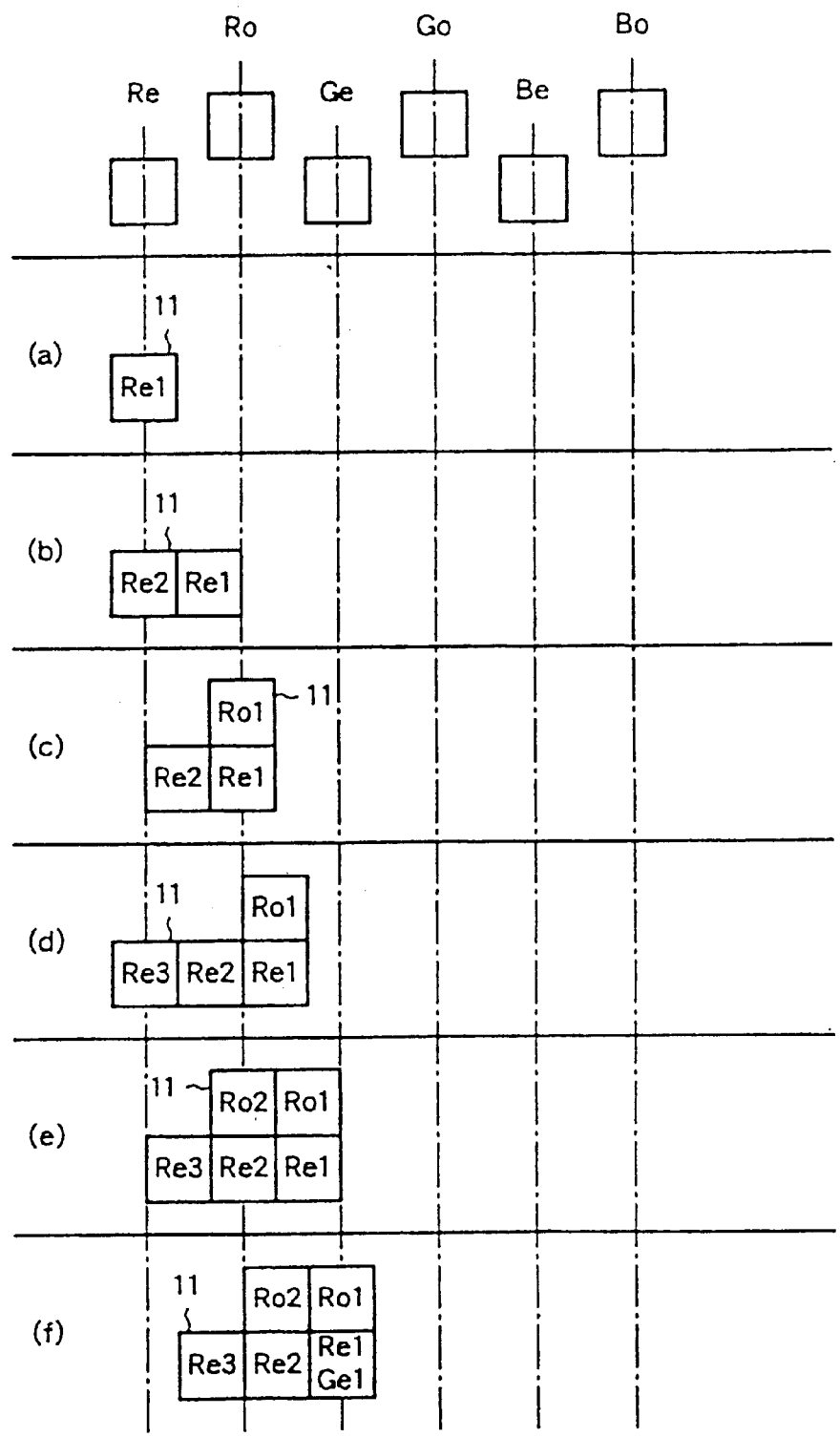
FIG. 8 is a diagram explaining the exposure operations in Embodiment 3 of the present invention in which timings (a) to (f) show the printing state at each of times (a) to (f) of FIG. 7.

FIG. 6a is a diagram showing an overall arrangement of liquid crystal shutter elements on a liquid crystal panel in the present embodiment, FIG. 6b is a diagram explaining the pitch between the liquid crystal shutter elements in a main scanning direction, FIG. 7 is an exposure timing chart for the liquid crystal elements during the printing operation, and FIG. 8 is a diagram explaining certain states of printing.

In FIG. 6a, six rows of liquid crystal shutter elements 10, namely two rows of each of three colors in the sequence red liquid crystal shutter element rows Re and Ro, green liquid crystal shutter element rows Ge and Go, and blue liquid crystal shutter element rows Be and Bo, are arranged in a zigzag pattern from the upstream side of the direction of conveyance of the medium (in other words, the auxiliary scanning direction). Moreover, in each of the liquid crystal shutter element rows there are m/2 liquid crystal shutter elements 10 in a direction perpendicular to the direction of conveyance of the photosensitive recording medium 2 (in other words, the main scanning direction), where m is the number of effective recording pixels in the image which is the subject of printing in the direction perpendicular to the direction of conveyance of the photosensitive recording medium (where $m \geq 2$).

Furthermore, the shape of each of the liquid crystal shutter elements 10 is a square with vertical and horizontal dimensions W×W, and the row spacing (row pitch) P between each of the liquid crystal shutter element rows is such that (P>W). In addition, the pitch between each of the liquid crystal shutter elements in the direction perpendicular to the direction of conveyance of the photosensitive recording medium straddling adjacent liquid crystal shutter element rows is set to a constant value such that 5 to 30 percent of the width W of the liquid crystal shutter elements overlaps relative to the main scanning direction (see FIG. 6b).

In FIG. 7, V represents the speed of conveyance of the photosensitive recording medium 2. The numerals in the drawing represent the exposure data in each of the liquid crystal shutter element rows corresponding to the line data of the image information in the auxiliary scanning direction. For example, 1 in the red liquid crystal shutter element rows Re and Ro, 1 in the green liquid crystal shutter element rows Ge and Go, and 1 in the blue liquid crystal shutter element rows Be and Bo represents the exposure data corresponding to the first line of the image information in the auxiliary scanning direction.

The letters in parentheses (a), (b), (c), etc., in FIG. 7 represent timing, and the printed states for each timing are represented by timings (a) to (f) in FIG. 8.

Ren, Ron, Gen, Gon, Ben, and Bon in FIG. 8 (where n=1, 2, 3, . . ., n) represent exposure of a given region in the exposed image 11 on the photosensitive recording medium 2 to a particular element of each of the colored liquid crystal shutter element rows, the appended numerals 1, 2, 3, etc., representing the exposure data in the first, second, third, etc., lines of the image information in the auxiliary scanning direction.

Moreover, because the overall construction of the assembly in Embodiment 3 is the same as for Embodiment 1 in FIG. 1 which was explained above, duplicate explanations will be omitted here.

Next, the operation of Embodiment 3 will be explained separately for each of the shutter element rows.

First, the exposure operation for red liquid crystal shutter element row Re will be explained. As shown in FIG. 7 and timing (a) of FIG. 8, each exposure through red liquid crystal shutter element row Re based on the respective line data Re1, Re2, Re3, etc., from the first, second, third, etc., lines of the image information in the auxiliary scanning direction is performed every time the conveyed distance L increases by one pixel width W (in other words, at intervals of W/V).

To explain this in more detail, the exposure through red liquid crystal shutter element row Re based on line data Re1 from the first line of the image information in the auxiliary scanning direction is first performed to record an exposed image 11 based on the line data Re1 on the photosensitive recording medium 2.

Next, the medium conveying rollers 4a and 4b are driven and rotated by a driving means (not shown), the conveyed distance L is detected by the medium conveyance distance detector 7, and when the conveyed distance L is equal to the width dimension W in the row direction of the liquid crystal shutter elements 10, exposure through red liquid crystal shutter element row Re based on line data Re2 from the second line of the image information in the auxiliary scanning direction is performed to record an exposed image 11 based on the line data Re2 on the photosensitive recording medium 2 adjacent to the exposed image 11 based on the line data Re1 above without any gaps, as shown in timing (b) of FIG. 8.

Similarly, whenever L=W, exposure based on line data Re3, Re4, . . . , Ren from the third, fourth, . . . , nth line of the image information in the auxiliary scanning direction is subsequently performed to record each adjacently without any gaps. Consequently, n number of exposed images 11 based on line data Re1 to Ren corresponding to the total number of lines n in the image information in the auxiliary scanning direction are recorded adjacently without any gaps in the auxiliary scanning direction.

Next, the exposure operation for red liquid crystal shutter element row Ro, which is the second row, will be explained.

As shown in FIG. 7 and timing (c) of FIG. 8, each exposure through red liquid crystal shutter element row Ro based on line data Ro1, Ro2, Ro3, etc., from the first, second, third, etc., lines of the image information in the auxiliary scanning direction is performed after a delay of P/V from the commencement of each exposure through the previous liquid crystal shutter element row, namely through red liquid crystal shutter element row Re, based on the respective line data Re1, Re2, Re3, etc., from the first, second, third, etc., lines of the image information in the auxiliary scanning direction.

To explain this in more detail, the exposure through red liquid crystal shutter element row Ro based on line data Ro1 from the first line of the image information in the auxiliary scanning direction is commenced after a delay of P/V from the commencement of exposure through red liquid crystal shutter element row Re, which is the liquid crystal shutter element row immediately preceding, based on line data Re1, to record an exposed image 11 based on line data Ro1 on the same line as the exposed image 11 based on line data Re1 (see timing (b) of FIG. 8).

Similarly, the exposure through red liquid crystal shutter element row Ro based on line data Ro2 from the second line of the image information in the auxiliary scanning direction is commenced after a delay of P/V from the commencement of exposure through red liquid crystal shutter element row Re based on line data Re2, to record an exposed image 11 based on line data Ro2 of the red liquid crystal shutter element row Ro on the same line as the exposed image 11 based on line data Re2 (see timing (e) of FIG. 8).

Similarly, exposed images 11 from the red liquid crystal shutter element row Ro based on line data Ro1 to Ron corresponding to the total number of lines n in the first to nth lines of the image information in the auxiliary scanning direction are each subsequently recorded on the same line as the exposed image 11 based on line data Re1 to Ren of the previous liquid crystal shutter element row, namely of red liquid crystal shutter element row Re (see timing (e) of FIG. 8). Consequently, each of the n exposed images 11 based on the line data Ro1 to Ron of the red liquid crystal shutter element row Ro is recorded on the same line as each of the n exposed images based on the line data Re1 to Ren of red liquid crystal shutter element row Re and, like the n exposed images based on the line data Re1 to Ren, adjacently without any gaps.

Furthermore, because the pitch of the liquid crystal shutter elements 10 straddling adjacent liquid crystal shutter element rows Re and Ro in the main scanning direction is set such that 5 to 30 percent of the width W of the liquid crystal shutter elements 10 overlaps, black stripe in the main scanning direction between the exposed image 11 based on the line data Re1 to Ren and the exposed image 11 based on the line data Ro1 to Ron can be completely eliminated from the recording.

Next, the exposure operation for green liquid crystal shutter element row Ge, which is the third row, will be explained.

As shown in FIG. 7 and timing (f) of FIG. 8, each exposure through green liquid crystal shutter element row Ge based on line data Ge1, Ge2, Ge3, etc., from the first, second, third, etc., lines of the image information in the auxiliary scanning direction is performed after a delay of P/N from the commencement of exposure through the previous liquid crystal shutter element row, namely through red liquid crystal shutter element row Ro, based on the respective line data Ro1, Ro2, Ro3, etc., from the first, second, third, etc., lines of the image information in the auxiliary scanning direction.

To explain this in more detail, the exposure through green liquid crystal shutter element row Ge based on line data Ge1 from the first line of the image information in the auxiliary scanning direction is commenced after a delay of P/V from the commencement of exposure through red liquid crystal shutter element row Ro, which is the liquid crystal shutter element row immediately preceding, based on line data Ro1, to overlay and record a dichromatic image based on line data by recording an exposed image 11 based on line data Ge1 on the same region as the exposed image 11 based on line data Re1 (see timing (f) of FIG. 8).

Similarly, the exposure through green liquid crystal shutter element row Ge based on line data Ge2 from the second line of the image information in the auxiliary scanning direction is commenced after a delay of P/N from the commencement of exposure through red liquid crystal shutter element row Ro based on line data Ro2 immediately preceding, to overlay and record a dichromatic image based on line data by recording an image based on line data Ge2 from the second line of green liquid crystal shutter element row Ge on the same region as the exposed image 11 based on the line data Re2.

Similarly, each exposure through green liquid crystal shutter element row Ge based on line data Ge1 to Gen from a total of n lines of image information in the auxiliary scanning direction is performed after a delay of P/V from the commencement of exposure through red liquid crystal shutter element row Ro, which is the previous liquid crystal shutter element row, based on the respective line data Ro1 to Ron, to overlay and expose a dichromatic image based on image line data by recording images based on line data Ge1 to Gen of green liquid crystal shutter element row Ge on the same region as the exposed image 11 based on the line data Re1 to Ren.

For exposure based on each set of line data in each line of the image information in the auxiliary scanning direction for the subsequent green liquid crystal shutter element row Go, and blue liquid crystal shutter element rows Be and Bo, each of the liquid crystal shutter element rows is driven such that in each case exposure is commenced after a delay of P/V from the commencement of exposure through the liquid crystal shutter element row immediately preceding by a similar procedure to the above.

The above operations are continued until all of the line data from the image information has been recorded. Furthermore, the photosensitive recording medium 2 is conveyed by the medium conveying rollers 4a and 4b to the developing means 5, and a developing operation is performed by the developing means 5 in sequence from the regions where an exposed image has been formed.

The arrangement in Embodiment 3 was in the order red liquid crystal shutter element rows Re and Ro, and green liquid crystal shutter element rows Ge and Go, and blue liquid crystal shutter element rows Be and Bo, but the arrangement order is not limited thereto, and two rows of each color may be arranged alternately.

In this embodiment, six rows of liquid crystal shutter elements 10, namely two rows of each of three colors in the sequence red liquid crystal shutter element rows Re and Ro, green liquid crystal shutter element rows Ge and Go, and blue liquid crystal shutter element rows Be and Bo, are arranged in a zigzag pattern, and for the first liquid crystal shutter element row on the liquid crystal panel 1 viewed from upstream in the direction of conveyance of the medium, exposure based on each set of line data from the image information in the auxiliary scanning direction is performed each time the conveyed distance L of the medium detected by the medium conveyance distance detector 7 is equal to the width W in the row direction of the liquid crystal shutter element rows, and for the second and subsequent liquid crystal shutter element rows, is performed after a delay of (liquid crystal shutter element row pitch P)/ (medium conveyance speed V of the photosensitive recording medium 2) from the commencement of exposure based on the line data for the liquid crystal shutter element row immediately preceding, whereby an exposed image 11 based on the trichromatic data from the same line of the image information in the auxiliary scanning direction is formed in the same position on the photosensitive recording medium 2 without any gaps in the auxiliary scanning direction. Consequently, a color image having a higher resolution than the resolution of the liquid crystal panel 1 can be obtained simply by the operation of feeding the photosensitive recording medium 2 in the auxiliary scanning direction without having to use three types of light source and without having to use two liquid crystal panels, enabling a high-quality printed image to be obtained by an inexpensive and comparatively compact assembly. Furthermore, because it is sufficient to use one liquid crystal panel, the permeability of the light from the light source is improved and exposure time can be reduced, shortening the printing time.

In addition, because the pitch of the liquid crystal shutter elements 10 straddling adjacent liquid crystal shutter element rows in the main scanning direction is set to a constant value such that 5 to 30 percent of the width of the liquid crystal shutter elements 10 overlaps, black stripe can be completely eliminated in the main scanning direction, enabling image quality to be improved without using a special driving means.

According to claim 1 of the present invention, because the liquid crystal panel is provided with red liquid crystal shutter element rows, green liquid crystal shutter element rows, and blue liquid crystal shutter element rows, each arrayed with m liquid crystal shutter elements in a direction perpendicular to the direction of conveyance of the photosensitive recording medium, where the number of effective recording pixels of the image which is the subject of printing is n in the direction of conveyance of the photosensitive recording medium, and m in the direction perpendicular to the direction of conveyance of the photosensitive recording medium, and red liquid crystal shutter element rows, green liquid crystal shutter element rows, and blue liquid crystal shutter element rows are arranged repetitively in an appropriate order at constant pitch such that (n+2) rows are arranged in the direction of conveyance of the photosensitive recording medium, and exposure through the liquid crystal shutter elements is activated every time the photosensitive recording medium is conveyed by the same distance as the constant pitch, a color image having a resolution three times greater than the resolution of the liquid crystal panel can be obtained by overlaying and exposing trichromatic image line data simply by the operation of feeding the photosensitive recording medium in the auxiliary scanning direction without having to use three types of light source and without having to use two liquid crystal panels. Consequently, a high-quality printed image can be obtained by an inexpensive and comparatively compact assembly. Furthermore, because it is sufficient to use one liquid crystal panel and the entire exposure operation is completed in three exposure operations, the permeability of the light from the light source is improved and exposure time can be reduced, shortening the printing time.

According to claim 2 of the present invention, because the liquid crystal panel is provided with red liquid crystal shutter element rows, green liquid crystal shutter element rows, and blue liquid crystal shutter element rows, each arrayed with m liquid crystal shutter elements in a direction perpendicular to the direction of conveyance of the photosensitive recording medium, where the number of effective recording pixels of the image which is the subject of printing is n in the direction of conveyance of the photosensitive recording medium (where $n \geq 2$), and m in the direction perpendicular to the direction of conveyance of the photosensitive recording medium, and red liquid crystal shutter element rows, green liquid crystal shutter element rows, and blue liquid crystal shutter element rows are arranged repetitively in an appropriate order at a pitch of two pixel widths such that when the number of recording pixels is even, (2+n/2) rows of liquid crystal shutter elements are disposed, and when the number of recording pixels is odd, [2+(n+1)/2] rows of liquid crystal shutter elements are disposed, and exposure through the liquid crystal shutter elements is activated every time the photosensitive recording medium is conveyed by a distance of one pixel width, an color image having a resolution six times greater than the resolution of the liquid crystal panel can be obtained simply by the operation of feeding the photosensitive recording medium in the auxiliary scanning direction without having to use three types of light source and without having to use two liquid crystal panels, enabling black stripe in the auxiliary scanning direction due to non-aperture portions on the liquid crystal panel to be eliminated. Consequently, a high-quality printed image can be obtained by an inexpensive and comparatively compact assembly. Furthermore, because it is sufficient to use one liquid crystal panel and the entire exposure operation is designed to be completed in six exposure operations, the permeability of the light from the light source is improved and exposure time can be reduced, shortening the printing time.

According to claim 3 of the present invention, because the liquid crystal panel is provided with red liquid crystal shutter element rows, green liquid crystal shutter element rows, and blue liquid crystal shutter element rows, each arrayed with m/2 liquid crystal shutter elements in a direction perpendicular to the direction of conveyance of the photosensitive recording medium, where the number of effective recording pixels of the image which is the subject of printing is m in the direction perpendicular to the direction of conveyance of the photosensitive recording medium (where m≧2), and two adjacent rows each of these red liquid crystal shutter element rows, green liquid crystal shutter element rows, and blue liquid crystal shutter element rows are arranged in an appropriate order in a zigzag pattern at a pitch P in the direction of conveyance of the photosensitive recording medium, and the exposure for each liquid crystal shutter row based on line data from an auxiliary scanning direction of the image information is performed every time the photosensitive recording medium is conveyed by a distance of one pixel width for the first liquid crystal shutter element row, and performed after a delay of P/V from the commencement of exposure of image data in the liquid crystal shutter element row immediately preceding (where V is the speed of conveyance of the photosensitive recording medium) for the second and subsequent liquid crystal shutter element rows, an exposed image based on the trichromatic data from the same line of the image information in the auxiliary scanning direction can be formed in the same position on the photosensitive recording medium without any gaps in the auxiliary scanning direction, without having to use three types of light sources and without having to use two liquid crystal panels. Consequently, a high-quality printed image can be obtained by an inexpensive and comparatively compact assembly. Furthermore, because it is sufficient to use one liquid crystal panel, the permeability of the light from the light source is improved and exposure time can be reduced, shortening the printing time.

Furthermore, because the pitch between each of the liquid crystal shutter elements in the direction perpendicular to the direction of conveyance of the photosensitive recording medium straddling adjacent liquid crystal shutter element rows is set to a constant value such that 5 to 30 percent of the width of the liquid crystal shutter elements overlaps, black stripe can be completely eliminated in the main scanning direction, enabling image quality to be improved without using a special driving means.

What is claimed is:

1. An optical color printer assembly comprising:
   a liquid crystal panel having liquid crystal shutter elements disposed in a two-dimensional pattern for selectively transmitting light from a light source by opening and closing pixels based on image information;
   an optical image forming means for transferring light from said light source which has passed through said liquid crystal panel onto a photosensitive recording medium and forming an image; and
   a medium conveying means for conveying said photosensitive recording medium to a developing means for developing,
   said liquid crystal panel being provided with red liquid crystal shutter element rows, green liquid crystal shutter element rows, and blue liquid crystal shutter element rows, each arrayed with m liquid crystal shutter elements in a direction perpendicular to a direction of conveyance of said photosensitive recording medium, where the number of effective recording pixels of said image which is the subject of printing is n in said direction of conveyance of said photosensitive recording medium, and m in said direction perpendicular to said direction of conveyance of said photosensitive recording medium,
   red liquid crystal shutter element rows, green liquid crystal shutter element rows, and blue liquid crystal shutter element rows being arranged repetitively in an appropriate order at constant pitch such that (n+2) rows are arranged in said direction of conveyance of said photosensitive recording medium, and
   exposure through said liquid crystal shutter elements being activated every time said photosensitive recording medium is conveyed by the same distance as said constant pitch.

2. An optical color printer assembly comprising:
   a liquid crystal panel having liquid crystal shutter elements disposed in a two-dimensional pattern for selectively transmitting light from a light source by opening and closing pixels based on image information;
   an optical image forming means for transferring light from said light source which has passed through said liquid crystal panel onto a photosensitive recording medium and forming an image; and
   a medium conveying means for conveying said photosensitive recording medium to a developing means for developing,
   said liquid crystal panel being provided with red liquid crystal shutter element rows, green liquid crystal shutter element rows, and blue liquid crystal shutter element rows, each arrayed with m liquid crystal shutter elements in a direction perpendicular to a direction of conveyance of said photosensitive recording medium, where the number of effective recording pixels of said image which is the subject of printing is n in said direction of conveyance of said photosensitive recording medium (where n≧2), and m in said direction perpendicular to said direction of conveyance of said photosensitive recording medium,
   red liquid crystal shutter element rows, green liquid crystal shutter element rows, and blue liquid crystal shutter element rows being arranged repetitively in an appropriate order at a pitch of two pixel widths such that when said number of recording pixels is even, (2+n/2) rows of liquid crystal shutter elements are disposed, and when said number of recording pixels is odd, [2+(n+1)/2] rows of liquid crystal shutter elements are disposed, and exposure through said liquid crystal shutter elements being activated every time said photosensitive recording medium is conveyed by a distance of one pixel width.

3. An optical color printer assembly comprising:
   a liquid crystal panel having liquid crystal shutter elements disposed in a two-dimensional pattern for selectively transmitting light from a light source by opening and closing pixels based on image information;
   an optical image forming means for transferring light from said light source which has passed through said liquid crystal panel onto a photosensitive recording medium and forming an image; and
   a medium conveying means for conveying said photosensitive recording medium to a developing means for developing,
   said liquid crystal panel being provided with red liquid crystal shutter element rows, green liquid crystal shutter element rows, and blue liquid crystal shutter element rows, each arrayed with m/2 liquid crystal shutter elements in a direction perpendicular to a direction of conveyance of said photosensitive recording medium, where the number of effective recording pixels of said image which is the subject of printing is m in said direction perpendicular to said direction of conveyance of said photosensitive recording medium (where m≧2), two rows each of these red liquid crystal shutter element rows, green liquid crystal shutter element rows, and blue liquid crystal shutter element rows being arranged in an appropriate order in a zigzag pattern at a pitch P in said direction of conveyance of said photosensitive recording medium, the pitch between each of said liquid crystal shutter elements in said direction perpendicular to said direction of conveyance of said photosensitive recording medium straddling adjacent liquid crystal shutter element rows being set to a constant value such that 5 to 30 percent of the width of said liquid crystal shutter elements overlaps, and exposure based on line data from an auxiliary scanning direction of said image information being performed every time said photosensitive recording medium is conveyed by a distance of one pixel width for said first liquid crystal shutter element row, and performed after a delay of $P/V$ from the commencement of exposure of image data in said liquid crystal shutter element row immediately preceding for the second and subsequent liquid crystal shutter element rows, where V is the speed of conveyance of said photosensitive recording medium.

* * * * *